United States Patent
Dallman

[11] Patent Number: 5,890,475
[45] Date of Patent: Apr. 6, 1999

[54] AUTOMOTIVE CRANKCASE VAPOR VENTILATION SYSTEM

[76] Inventor: Alfred C. Dallman, 1309 Donson Dr., Dayton, Ohio 45429

[21] Appl. No.: 119,762

[22] Filed: Jul. 21, 1998

[51] Int. Cl.$^6$ ........................................ F02M 7/00
[52] U.S. Cl. ............................................. 123/573
[58] Field of Search .................................. 123/572, 573, 123/574, 41.86

[56] References Cited

U.S. PATENT DOCUMENTS

| | | | |
|---|---|---|---|
| 4,066,055 | 1/1978 | Hager | 123/572 |
| 4,090,477 | 5/1978 | Gockel | 123/572 |
| 4,102,314 | 7/1978 | Sarto | 123/572 |

*Primary Examiner*—Marguerite McMahon

[57] ABSTRACT

A crankcase ventilation system withdraws vapors from the crankcase of an internal combustion engine by using intake manifold vacuum to transfer crankcase vapors from a position in the engine crankcase, away from any lubricant pool, into the air/fuel intake manifold system, thereby moving the crankcase vapors along with a controlled amount of bleed (ambient) air to the intake manifold of the engine. The engine crankcase is kept under negative pressure by careful sizing of the parts, and the intake tube for bleed air is the only air admission to the crankcase so as to maintain this negative pressure condition within the engine crankcase. The bleed air intake tube is located adjacent the outlet tube for combining crankcase vapors and bleed air, without particulate or contaminates from the crankcase, and directed to the engine fuel/air intake manifold through a thermal cooling chamber. Any existing ventilation air inlet port is blocked (in retrofit to existing systems) and is not provided in OEM systems according to the invention. Recirculation of blow-by gases, and bleed air is aided by the fact that the crankcase vapors are in transit from a hot crankcase region to a much cooler vapor region.

6 Claims, 2 Drawing Sheets

FIG. 2

AUTOMOTIVE CRANKCASE VAPOR VENTILATION SYSTEM

FIELD OF THE INVENTION

The present invention is an improvement on the invention disclosed in U.S. Pat. No. 4,779,601 relating to control of crankcase emissions for automotive engines.

BACKGROUND OF THE INVENTION

Installation of such crankcase vapor recirculating systems, commonly known by their acronym PCV standing for positive crankcase ventilation, was the first and only emission reduction system installed on all internal combustion engines which was mandated by the Federal EPA beginning in 1963. Typical such existing systems for recirculating crankcase vapors into the air\fuel intake system of an internal combustion engine are disclosed and illustrated in U.S. Pat. No. 3,677,240 to Sarto, incorporating basically the same crankcase vapor recirculation circuit that is required to be installed on all internal combustion engines by the U.S. EPA, beginning in 1963. In such system, ventilating air is introduced to the engine crankcase in substantial quantities and at essentially ambient pressure and temperature.

Because of the widespread use of PCV systems, the hardware provided as part of the present invention has, as much as possible, been designed to readily be installed in the PCV ports provided on virtually all originally manufactured internal combustion engines sold and driven or used in the United States since 1963. This port is most commonly found on [or on one of] the valve covers of the engines.

SUMMARY OF THE INVENTION

As is generally known, chemical analysis has disclosed that crankcase vapor is about 15 percent fuel-air mixture, and the balance is combustion exhaust gases. The purpose of this invention is to lower undesirable exhaust emissions, and to improve performance and fuel economy, by employing an different and more sophisticated system than the above mentioned U.S. Pat. No. 3,677,240 for Crankcase Ventilation, which is typical of the state of the art prior to the inventions disclosed in U.S. Pat. Nos. 4,279,236; 4,404,950; and 4,779,601, all granted to Alfred C. Dallman.

Changes in the prior systems disclosed in the Dallman patents were determined to be necessary by conducting an extensive program of EPA tests at government sanctioned test sites, using randomly selected rental automobiles in which the disclosed crankcase vapor ventilation (CVV) system was installed, to obtain a substantial reduction of toxic emissions and to achieve fuel economy improvement. This invention is the result of such testing and design effort and provides a crankcase vapor recirculation system that is markedly superior to the systems currently in use.

The present invention, termed a crankcase vapor ventilation (CVV) system, totally replaces the older PCV systems and circuits, and will also, in many instances, improve fuel economy to some extent. The CVV system of the present invention provides for maximum utilization of crankcase vapor to reduce toxic smog producing emissions by efficiently recirculating the crankcase vapors through the internal combustion engine, utilizing easily manufactured and applied hardware components. The CVV system achieves superior performance over currently used PCV systems in terms of reducing exhaust emissions, as is explained hereinafter. Toxic emissions are reduced to a far greater degree by the CVV system, and efforts required to lower emissions enough to meet more stringent regulations, such as typified by the 1998 California Emission Standards, are made far less difficult.

The CVV system withdraws vapors from the crankcase of an internal combustion engine by using the intake manifold vacuum to transfer crankcase vapors from a position in the engine crankcase away from any lubricant pool, into the air/fuel intake manifold system of the engine, thereby moving the crankcase vapors along with a controlled amount of bleed (ambient) air through the internal combustion engine cylinders. The engine crankcase is kept under negative pressure by careful sizing of the parts, and the intake tube for bleed air is the only air admission to the crankcase so as to maintain this negative pressure condition within the engine crankcase. The bleed air intake tube is located adjacent the outlet tube for combined crankcase vapors and bleed air directed to the engine fuel/air intake manifold. The normally used ventilation air inlet port is totally blocked in retrofit of the invention to existing systems, and is not provided in OEM systems according to the invention. The recirculation of blow-by gases, which escape past the piston rings to the crankcase, is aided by the fact that the crankcase vapors are in transit from a hot crankcase region [e.g. within the engine crankcase] to a much cooler vapor region [e.g. the engine air, or air/fuel, intake manifold]. As the vapor cools, its molecules and their activity increases (e.g. they "speed up"), creating a draft effect drawing from the crankcase to the engine fuel/air intake manifold. Under running conditions, the intake manifold is also under vacuum, which varies depending on the throttle plate opening, and this also tends to draw the vapor stream through the CVV circuit.

The high thermal conductivity of copper and other metals makes them a poor choice of material for fabricating the valve cover unit (VCU) of this invention, when used in the hot vapor region, and a low heat-conducting material, such as a suitable plastic, should be used. If additional cooling of the recirculated vapor is desired, it should be provided at the intake manifold end of the circuit, never at the hot vapor region. A thermal cooling chamber is provided for that purpose in the invention.

The CVV system of the present invention is designed to maintain a vacuum (negative pressure) in the engine crankcase, as distinguished from prior systems which induce a positive air flow through the crankcase. The system disclosed herein is composed of only one major circuit that contains no moving parts, except a flow control device that is needed to control vapor flow when the engine is at idle or operating with no throttle applied. A unique component of the CVV system is the bleed air/crankcase vapor mixing device, identified as a valve cover unit (VCU), which incorporates a bleed tube circuit that makes the invention viable.

The best available flow control device is a high-flow plastic springless PCV Valve. Two types of such PCV valves are available, one which closes totally, and the other which only restricts the flow of crankcase vapors under maximum manifold vacuum conditions. The preferred type for use in the CVV system is the second type, which restricts the flow of crankcase vapors when high manifold vacuum occurs.

Alternatively, an electric solenoid valve system, containing an orifice bleed circuit that either by-passes or passes through the solenoid piston, can be substituted for a PCV valve.

BRIEF DESCRIPTION OF THE DRAWINGS

Figure 2:
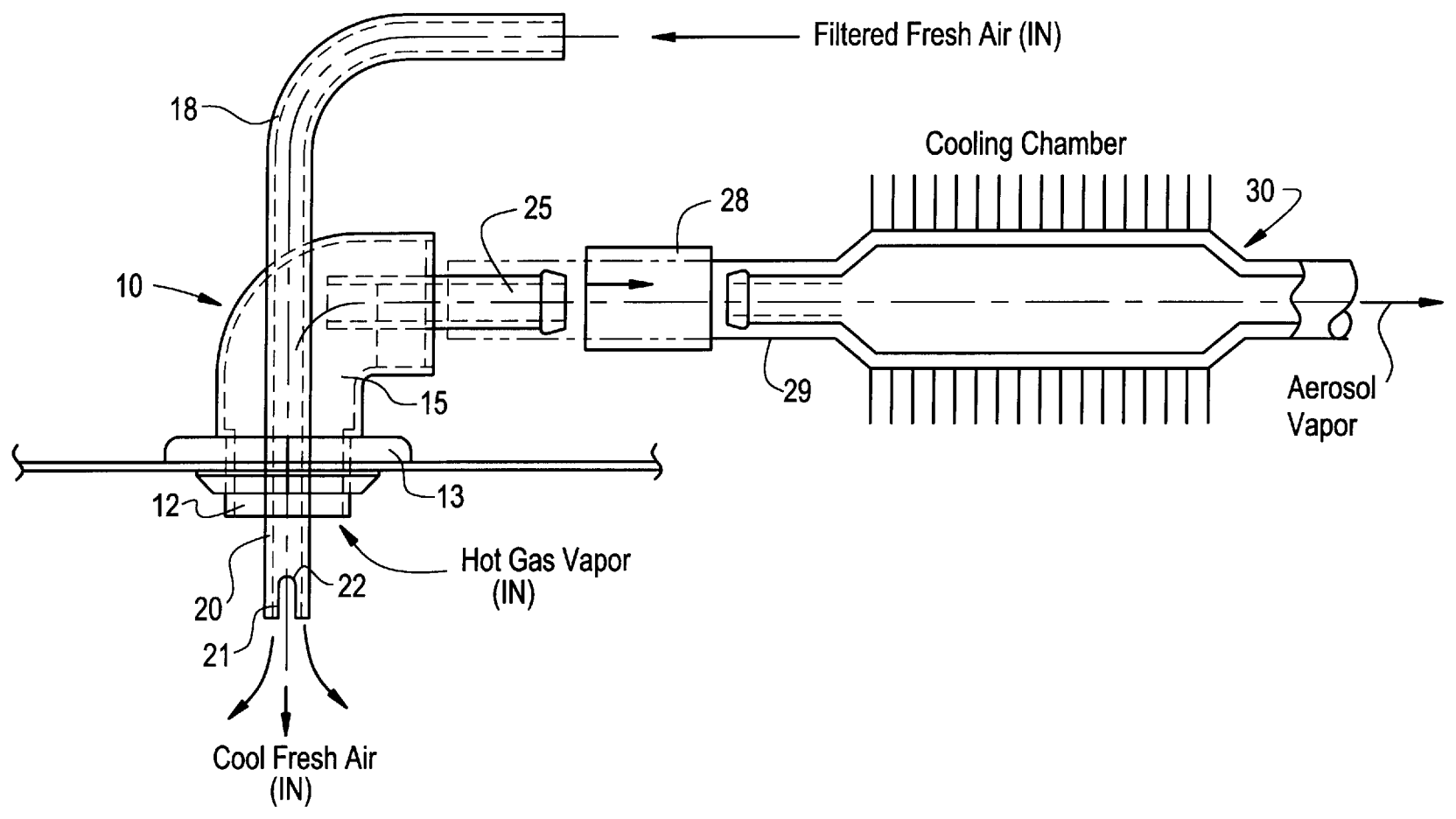

FIG. 2 is an enlarged view showing details of the invention, and particularly of the valve cover unit and thermal cooling chamber.

DESCRIPTION OF THE PREFERRED EMBODIMENT

Figure 1:
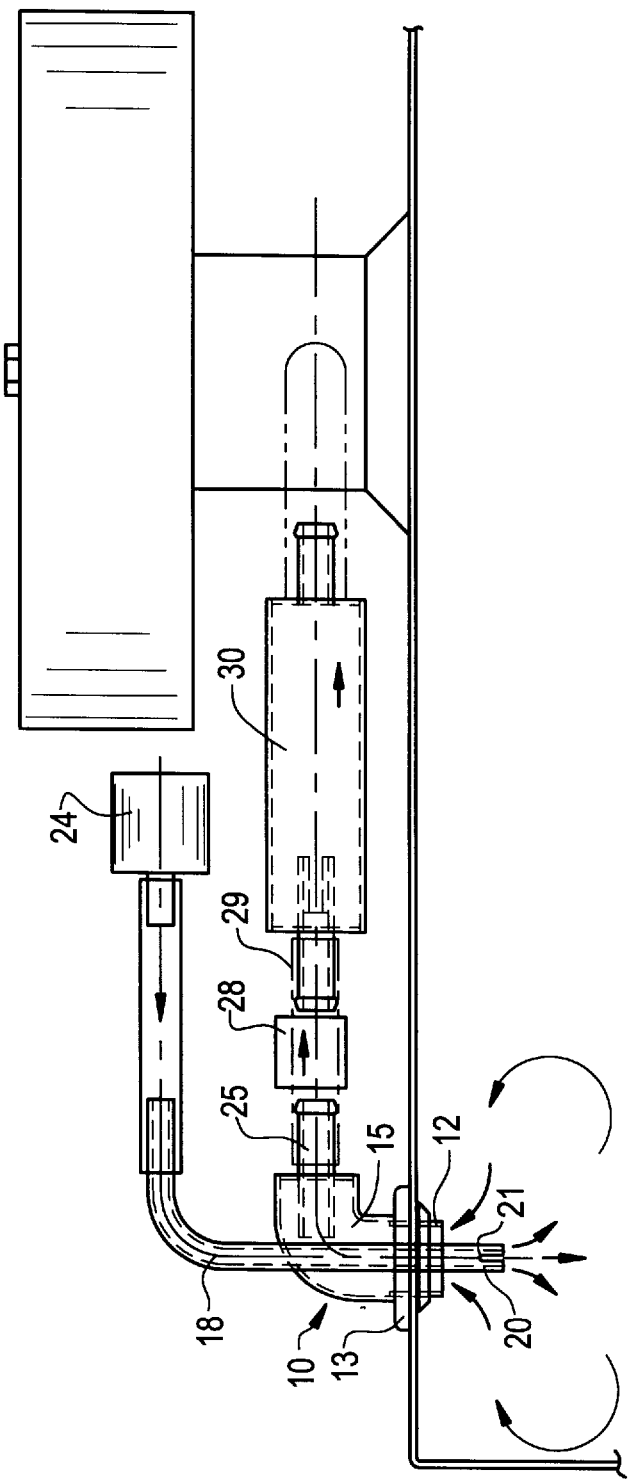
FIG. 1 is an over all view of the system provided by this invention.

Crankcase vapors are continuously circulating through the engine crankcase system. Blow-by gases (from combustion and incomplete combustion) are introduced to the crankcase as the result of some leakage past the piston rings with each compression and power stroke, and are removed at the same rate by the crankcase vapor recirculating system. Such systems have employed a considerable flow of induced ambient air through the crankcase to dilute and entrain the vapor, as discussed above, usually with a fairly large intake located some distance from the region where the crankcase vapors are drawn to the engine's fuel/air intake.

Referring to FIG. 1, the valve cover unit or housing (VCU) 10 includes a nipple 12 which (in an actual embodiment) has a predetermined OD (for example ¾ inch OD for GMC and Ford engines and ½ inch for older Chrysler cars) and which is inserted into grommet 13 fitted to an suitable aperture in an engine valve cover 14. This location should be in full communication with the main crankcase and the pool of lubricant therein, and should be at a position elevated above such pool so only vapors, and not liquid, will be entrained in the flow through the CVV system. An upward and outward extending tubular body 15, preferably elbow shaped as shown, is mounted in air-tight fashion into grommet 13. Nipple 12 can be an integral (e.g. necked down) extension of the lower end of body 15 if desired. A bleed tube 18 is centrally located through the turn of the elbow shaped body 15, and has a predetermined outer diameter, preferably ⅜ inch for optimum performance.

Bleed tube 18 is a critical part of the valve cover unit 10. It provides the sole source of ventilation air into the crankcase; in retrofit installations other crankcase air inlets are closed or blocked. Tube 18 has its outlet end 20 located inside body 15, extending inward through nipple 12 to the interior of valve cover 14, and preferably includes a slot 21 in its outlet end, the base 22 of slot 21 being located very close to (e.g. 0.310 inches below) the lower edge of nipple 12. Tube 18 may be curved as shown, or straight, depending on the space available for installing the system. In any event, an air filter 24 is fitted to the inlet end of tube 18 through a hose 19 to filter contaminant from the ambient air which is drawn into tube 18 during operation.

The air/vapor outlet tube 25 extends from body 15 for conducting the combined crankcase vapors and ventilating air which flow into housing body 15 through the space around end 20 of bleed tube 18. The output tube 25 preferably has an inner diameter range of 5/16 to ⅜ inches to obtain optimum performance. A flow control device 28 is attached to (or close to) outlet tube 25. The preferred form of such flow control device is a commercially available PCV valve which restricts (but does not close) the flow of mixture when the engine is operating at maximum manifold vacuum, to avoid excessive NOx formation. The flow control device 28 is then connected, as by a tube 29, to a thermal cooling chamber 30 which is located close to, and connected into, the engine intake manifold. The material of which chamber 30 is formed should be of a good heat conducting material; in an actual embodiment used in testing (see below) a finned copper cylinder constructions was used.

Reduction of Toxic Crankcase Emissions

A number of tests were performed on the crankcase vapor ventilation [CVV] system of the present invention to determine the amount of toxic emissions from an engine fitted with the system. The vehicles (and engines) used were chosen at random from available rental vehicles, namely passenger automobiles, and tested at a Federal and State of Ohio sanctioned test facility located at Automotive Test Laboratories, East Liberty, Ohio. The test regimen used is termed a "Hot 505" test, which involves bringing the vehicle engine to operating temperature, then running the vehicle on a dynamometer, within a chamber wherein the environment is controlled, through a series of speed changes and grade variation for a time lapse of 505 seconds. This test regimen is considered to be efficient and thorough, though economical. Hot 505 Emission Tests are conducted because they provide worst case control data and are very cost effective.

Thirteen EPA compliance Test Programs were conducted on the disclosed CVV system at the Automotive Test Laboratories The data obtained from these Test Programs support critical design dimensions mentioned above and confirm the need for fabricating the VCU from a more heat insulating plastic rather than a heat conducting metal such as copper. It is important to note that for all the Tests conducted, a current state of the art PCV system was used for obtaining base line data.

The test results showed that hydrocarbon emission [HC] was reduced by as much as 21.6 percent, carbon monoxide [CO] was reduced as much as 79.9 percent, and a combination of many oxides called nitrous oxide [NOx] was reduced as much as 5.4 percent. These tests demonstrated that all of the toxic emissions were reduced considerably more than with present systems, in addition to improving fuel economy.

This finding was confirmed by installing a standard positive crankcase ventilation [PCV] valve in place of the valve cover unit 10 to control crankcase vapor flow with the engine operating under high manifold vacuum conditions; this caused the generation of excessive NOx.

To determine the value of the thermal cooling chamber (TCC) 30, another test was conducted with this component omitted. In such test the value of the HC reduction percentage decreased from 21.6 to 3.9 percent, and the CO and NOx reductions were not significant. This test result established that to obtain a maximum decrease in HC, the thermal cooling chamber must be included.

Eliminating (e.g. blocking) the normal direct fresh air intake port to the engine crankcase has been observed to increase the crankcase vacuum. Thus, drawing all crankcase ventilation air through bleed tube 18 improves the operating efficiency of the bleed air circuit, which in turn improves the operating efficiency of this novel entire crankcase ventilation system.

The "Hot 505 Tests" demonstrated that the best emission reduction values are obtained when all ambient air intake to the crankcase (bleed air) is introduced through bleed tube 18, and proves that ventilation of the crankcase vapor alone is far better than ventilating the entire crankcase system. In addition, introducing all the ventilation air through the bleed tube 18 also minimizes water vapor (and foreign material) contamination of the crankcase oil under high humidity conditions.

Hot 505 Emission Tests mentioned above are conducted because they provide worst case control data and are very cost effective.

Also, in actual testing of the systems provided by the invention, it was found that all dimensions are sensitive to optimum design and performance, particularly the inner diameter of the ambient air bleed tube 18, the outer diameter of the bleed tube, and the inner diameter of the VCU output tube 25.

To comply with the California Emission Standards promulgated by the California Air Research Board (CARB) it is necessary to conduct EPA Cold Start 75° F. tests to obtain cold start composite data. It has been reported in the literature that a 16 valve 2.2 L engine was successfully certified at the CARB Emissions test facility at El Monte Calif., and was the first automobile engine that met the stringent 1998 California emission standards.

The 1998 CARB Emission Standards include 100,000 mile in addition to the 50,000 mile standards. The 100,000 mile standard is dependent upon the durability of the emission reduction system employed. The certified engine reportedly depends to a considerable extent upon the placement of two three way catalytic converters in the engine exhaust system. The first converter is located as close as possible to the engine exhaust manifold outlet, and the second converter is located farther downstream in the exhaust system.

It is believed that use of the CVV system of the present invention would make possible the use of smaller such converters thereby increase durability of the entire exhaust system and increase the probability for meeting those 100,000 mile Emission Standards. By using the emission reduction capability of the optimized CVV system to assist in the task, automobile manufacturers will not have to depend totally on the size and location of the thermal cooling chamber (TCC) to complete the task.

While the method herein described, and the forms of apparatus for carrying this method into effect, constitute preferred embodiments of this invention, it is to be understood that the invention is not limited to these precise method and forms of apparatus, and that changes may be made in either without departing from the scope of the invention, which is defined in the appended claims.

For example, the foregoing disclosure emphasizes the use of the invention on a fuel injected gasoline powered (Otto cycle) internal combustion engine. It should be understood, however, that the invention is applicable to all engine types that are required to be equipped with a Crankcase Vapor Recirculating system, such as diesel or combination cycle engines.

What is claimed is:

1. A system for withdrawing vapors from the crankcase of an internal combustion engine and conducting said vapors into the fuel/air supply system of the engine for combustion within the engine, comprising a housing fitted in sealed relation into an opening in the engine and communicating with the interior of the engine's crankcase, said housing including a main body, an inlet bleed tube through said housing providing the sole passage for a controlled quantity of ambient air into the crankcase, an outlet tube extending from said housing and providing the sole exit for air and entrained crankcase vapors from the engine crankcase, said outlet tube having a flow control device at its end opposite from said housing, means providing a thermal cooling chamber connected to receive the air/vapor flow from said flow control device, and a tube providing a connection from said thermal cooling chamber to the engine's intake manifold whereby the engine crankcase is operated at a vacuum whenever the engine is running and the sole air flow intake through the crankcase is through said air bleed tube.

2. The systems defined in claim 1, wherein said housing is located on the engine at an elevation away from liquids contained in the engine crankcase and water vapor entrained in the intake bleed air will be drawn to the flow control device, thereby avoiding collection of water vapor in the crankcase from contaminating the crankcase oil.

3. The system as defined in claim 1, wherein said flow control device is a PCV valve control.

4. The system as defined in claim 1, wherein said flow control device is a solenoid operated valve which is adapted to throttle the flow of intake air and crankcase vapors to said thermal cooling chamber during conditions of high engine intake vacuum.

5. The system of claim 1, wherein said thermal cooling chamber is constructed of material having a high thermal heat conductivity.

6. A method of withdrawing vapors from the crankcase of an internal combustion engine and conducting said vapors into the fuel/air supply system of the engine for combustion within the engine, comprising withdrawing crankcase vapors along with a controlled quantity of ambient air into a housing which provides the sole passage for a controlled quantity of ambient air into the crankcase, connecting the housing via an outlet tube providing the sole exit for air and entrained crankcase vapors from the engine crankcase, controlling the flow through said outlet tube to avoid excess vacuum in the engine crankcase, directing the air and vapor mixture through a thermal cooling chamber and to the engine's intake manifold whereby the engine crankcase is operated at a vacuum whenever the engine is running and the sole air flow intake through the crankcase is through said air bleed tube.

* * * * *